United States Patent
Henn

(10) Patent No.: US 9,586,140 B2
(45) Date of Patent: Mar. 7, 2017

(54) PERCEPTION SYSTEM

(71) Applicant: Disney Enterprises, Inc., Burbank, CA (US)

(72) Inventor: James M. Henn, Salt Lake City, UT (US)

(73) Assignee: Disney Enterprises, Inc., Burbank, CA (US)

( * ) Notice: Subject to any disclaimer, the term of this patent is extended or adjusted under 35 U.S.C. 154(b) by 190 days.

(21) Appl. No.: 13/969,289

(22) Filed: Aug. 16, 2013

(65) Prior Publication Data

US 2015/0051000 A1 Feb. 19, 2015

(51) Int. Cl.
| | | |
|---|---|---|
| A63F 9/24 | (2006.01) | |
| A63F 13/35 | (2014.01) | |
| A63F 13/5375 | (2014.01) | |
| A63F 13/577 | (2014.01) | |

(52) U.S. Cl.
CPC .......... *A63F 13/35* (2014.09); *A63F 13/5375* (2014.09); *A63F 13/577* (2014.09); *A63F 2300/64* (2013.01)

(58) Field of Classification Search
None
See application file for complete search history.

(56) References Cited

U.S. PATENT DOCUMENTS

| | | | | |
|---|---|---|---|---|
| 2002/0019257 A1* | 2/2002 | Koizumi et al. | ............... | 463/32 |
| 2003/0060248 A1* | 3/2003 | Yamashita | ................ | 463/1 |
| 2004/0259616 A1* | 12/2004 | Hirai | .............. | A63F 13/10 463/4 |
| 2006/0246972 A1* | 11/2006 | Thomas | ............... | A63F 13/10 463/4 |
| 2006/0287027 A1* | 12/2006 | Hardisty | ............... | A63F 13/10 463/8 |
| 2007/0060374 A1* | 3/2007 | Youm | ............... | A63F 13/10 463/42 |
| 2007/0117636 A1* | 5/2007 | Takahashi | ............... | A63F 13/10 463/43 |
| 2007/0155501 A1* | 7/2007 | Kanemori et al. | ............. | 463/37 |
| 2007/0202936 A1* | 8/2007 | Ishii | ................ | 463/8 |
| 2007/0213107 A1* | 9/2007 | Itou et al. | ............. | 463/1 |
| 2007/0260567 A1* | 11/2007 | Funge et al. | ............. | 706/47 |
| 2009/0258709 A1* | 10/2009 | Yamagami | ............. | A63F 13/10 463/43 |
| 2010/0184498 A1* | 7/2010 | Takahashi et al. | ............... | 463/8 |
| 2012/0302351 A1* | 11/2012 | Murphy | ............... | A63F 13/12 463/42 |

* cited by examiner

*Primary Examiner* — Jason Yen
(74) *Attorney, Agent, or Firm* — Sheppard Mullin Richter & Hampton LLP

(57) ABSTRACT

System and methods to guide interaction of characters with objects in a virtual space include determining how objects near a particular character are perceived by that character. Based on proximity, position, the manner of possible interaction, and/or other considerations, objects are ranked for interaction with the character.

15 Claims, 3 Drawing Sheets

PERCEPTION SYSTEM

FIELD OF THE DISCLOSURE

The present invention relates generally to interaction between characters in a virtual space, such as a (networked) video game. Non-player characters and human-controlled characters can select to interact with numerous objects or other characters within the virtual space. The present invention relates generally to systems and methods for guiding interactions of characters within a virtual space.

BACKGROUND

Conventionally, in a (multi-character and/or networked) game, characters and/or objects may interact in the same instance of the game. Users or players may interact with objects, other characters, and/or non-player characters (NPCs). NPCs are typically controlled through Artificial Intelligence (AI), rules, goals, and/or other mechanisms. NPC actions and movements may be governed by the same or similar rules (e.g. physics rules) as characters controlled by human players. For example, characters may be not permitted to walk through walls or other solid objects. The types of possible and/or permissible interactions of a character with objects and other characters may depend on attributes of a character and/or object, as well as other considerations.

Typically, the map of the virtual space is similar if not the same for all players. That is, the terrain is mostly the same, even if some smaller objects may be in different locations for different players.

One way to guide interactions of characters within the virtual space may be by constantly checking and/or detecting whether an individual character is so close to any objects that the individual character is permitted to interact with it (and whether the particular object is of a type that the individual character is able to interact with at that moment). Computationally, this may be costly. For complex virtual spaces that include many objects and many characters, permitted interactions may be numerous, such that constantly checking and/or detecting may be complicated and/or cost-prohibitive. Furthermore, the number of permitted interactions may be so numerous that human-controlled characters may be overwhelmed by evaluating all or most options.

SUMMARY

One aspect of the disclosure relates to a system configured to provide a virtual space to users. Providing the virtual space may include hosting the virtual space over a network for a virtual space provider. One aspect of the disclosure relates to a system configured to guide interaction of characters with objects and/or other characters in a virtual space. As used herein, the term "interactions" may encompass actions by a character as well as interactions between a character and one or more objects or other characters.

The virtual space may implement a game, for example a networked game. The system may include one or more servers. The server(s) may be configured to communicate with one or more client computing platforms according to, e.g., a client/server architecture. In some implementations, server(s) may be configured to communicate with one or more client computing platforms in a peer-to-peer architecture, and/or another suitable architecture. In some implementations, client computing platforms may be configured to communicate to other client computing platforms in a peer-to-peer architecture, and/or another suitable architecture. The users may access the system and/or the virtual space via client computing platform(s).

The server may implement one or more instances of the virtual space. Users may interact with an instance of the virtual space through individual client computing platforms. Individual client computing platforms may interact and/or communicate with the server over one or more networks. Client computing platforms may be associated with users. Individual client computing platforms may be associated with individual users.

The virtual space may include one or more characters. Characters may be playable, controllable, and/or controlled actors within the virtual space. Characters may be controlled by human players, by artificial intelligence (AI), by the instance of the virtual space that is hosted by the server, by testing resources, by other components of the virtual space, as network-controlled characters, and/or other types of control, as well as combinations thereof. The mode of control may change during a game.

The virtual space may include objects. Objects may be capable and/or intended to be interacted with, and/or affecting gameplay somehow within the virtual space. Objects may be distinguished from terrain, which may be generally passive and/or immutable. As used herein, mutable and/or changeable terrain-elements may be considered objects for the purposes of this disclosure. For example, in most games, the ground or the sky may be considered terrain; a building, a rock, and/or a weapon may be objects. As used herein, characters may be referred to as objects because another character may be capable and/or may intend to interact with other characters. Most objects that are not controlled and/or are passive components within the virtual space may not be referred to as characters. Advanced types of games may allow a large number of possible interactions during gameplay. By virtue of the guidance provided as described in this disclosure, users/players/NPCs may interact more easily and/or faster within the virtual space.

Objects within the virtual space may be classified and/or organized in object types. Object types may defined by purpose, intended use, size, capabilities, and/or other distinctions. For example, object types may be small weapons, large weapons, short-range weapons, mid-range weapons, modes of transport, and/or other object types. A knife or gun may be classified as a small weapon. A bazooka may be classified as a large weapon. A horse, bike, scooter, and/or car may be classified as modes of transport. A gun and a bazooka may be classified as mid-range weapons, because you can shoot things that are not right next to you or in your proximity. In contrast, a knife may be classified as a short-range weapon. Objects may correspond to multiple object types. For example, a knife may be classified as a small weapon and a short-range weapon. In some implementations, object type classification and/or organization may be character-specific. For example, for sufficiently large and/or strong characters, a distinction between small and large weapons may not be needed.

From the perspective of an individual character (e.g. a human-controlled character or an AI-controlled NPC) other characters within the virtual space may be classified and/or organized in object types. For example, a harmless but annoying monster may be classified as a limited-threat target. A dangerous enemy monster may be classified as a high-threat target. Helpful and/or friendly characters may be classified as not-a-target. Such classification and/or organization may be static and/or inherent (e.g. predetermined prior to gameplay). In some implementations, such classification and/or organization may be dynamically determined and/or modifiable based on gameplay, user-specific preferences, user-specific customization, context, and/or other considerations.

Objects may be classified and/or organized in groups that have at least some distinguishing feature in common. For example, a group of "things to fight other characters with" may include objects of varying object types, including but not limited to small weapons, large weapons, short-range weapons, mid-range weapons, and/or other object types. For particular characters, e.g. a smaller character, such a group may not include objects of the large weapons object type, e.g. because the smaller character cannot lift or hold a bazooka. Any particular object that an individual character encounters may be included in one or more groups. For example, the same object, a sizable banana, may be picked up, thrown, eaten, and/or wielded for fighting.

Groups may be associated with perception types. A perception type may correspond to the manner of interaction with a character. For example, a bike or car may have a perception type that corresponds to "things to ride or drive". A horse or dragon may have a perception type that corresponds to "things to mount as a means of transportation." Monsters or varying kinds may have a perception type that corresponds to "things to target weapons on" or "things to fight". The perception type "things to target weapons on" may interchangeably be referred to as "auto-target". In some implementations, individual groups may be associated with individual perception types. In some implementations, users may organize and/or change the definitions of groups and/or perception types. In some implementations, the definitions of groups and/or perception types may be modified by the system, for example based on past interactions by a particular character.

Objects may be associated with detection types. A detection type may correspond to requirements for a particular character to interact with that object. Detection types may be distinguished by proximity or distance from a character. For example, some objects may only be interacted with if a particular character is sufficiently close to the object. For example, a character may be able to mount a horse if the character is within a short distance from the horse. Detection types may be distinguished by relative position, angle, and/or direction compared to a character. For example, some objects can only be interacted with if they are in the line of sight for a character, a field of view of a character, a generally facing direction of a character, etc. For example, deploying a hand grenade may require less precise aiming, targeting, and/or lining up with a character than using a magic spell or a bow and arrow. In some implementations, objects may be associated with multiple detection types.

Objects and characters may be associated with state attributes. State attributes may correspond to current activities and/or capabilities. State attributes may be static and/or inherent, and/or dynamically modified during gameplay. For example, a character may have super strength, enabling him to lift and/or use large weapons, etc. For example, a character may currently be walking, swimming, riding, driving, and so forth. Current state attributes may be used to determine which actions are permissible. Current state attributes may be used to determine which perception types are relevant. For example, swimming characters may be unable to pick up certain objects, mounted characters may be unable to jump and/or use certain weapons. Self-explanatory state attributes may include IsOnGround, IsDrivingVehicle, IsCarryingWeapon, HasSuperStrength, CanRideHorses, and so forth. State attributes may be stored in a spreadsheet and/or database for use by the system.

The server(s) may be configured to execute one or more computer program modules. The computer program modules may include one or more of a space module, a proximity module, an object type module, a group module, a preference module, a ranking module, a selection module, and/or other modules. The space module may be configured to implement one or more instances of the virtual space executed by the computer modules to determine views of the virtual space. The space module may be configured to generate and/or determine user interfaces for presentation to users, and/or to obtain instructions to modify locations of objects in the virtual space. The proximity module may be configured to determine which objects are sufficiently close to a character for interaction. The object type module may be configured to determine the object types of sufficiently close objects. The group module may be configured to group objects together based on one or more common perception types. The preference module may be configured to select one or more preferred objects per group. The ranking module may be configured to rank preferred objects from different groups (e.g. numerically) for interaction between the character and individual ones of the preferred objects. The selection module may be configured to determine and/or obtain a selection for one or more objects to interact with the character.

The server(s) and/or the client computing platform(s) may include electronic storage. The electronic storage may comprise non-transitory storage media that electronically stores information. The electronic storage may be configured to store perception information for one or more characters in a virtual space. Perception information for an individual character may include one or more groups of object types. Groups may be associated with one or more perception types.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
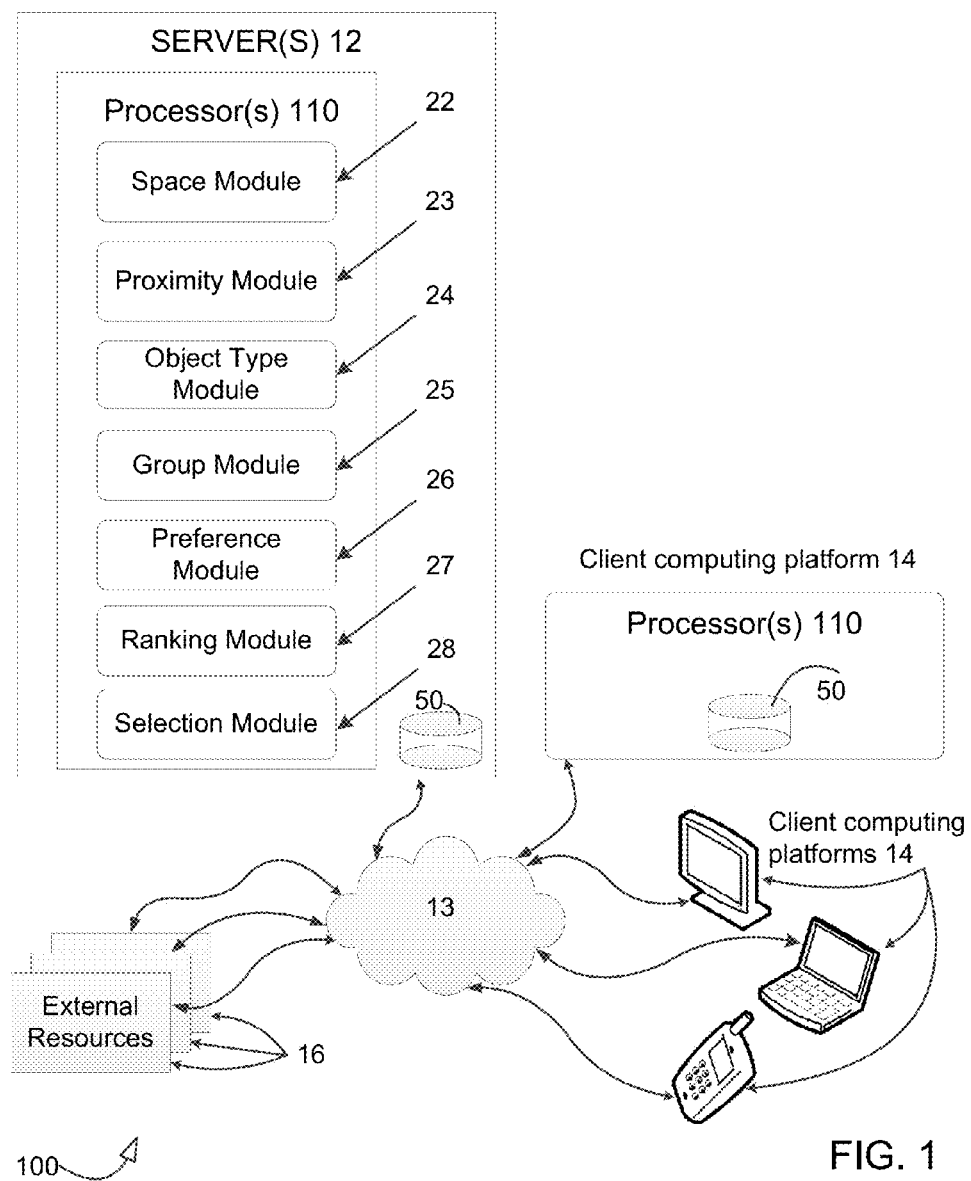
FIG. 1 illustrates a system configured to guide interaction of characters with objects in a virtual space, in accordance with one or more embodiments.

FIG. 1 illustrates a system 100 configured to provide a virtual space to users. Providing the virtual space may include hosting the virtual space over a network for a virtual space provider. System 100 may be configured to guide interaction of characters with objects and/or other characters in a virtual space. In some implementations, guidance for a particular character may include ranking and/or presenting an optional interaction and/or object for interaction from a larger set of options. Selection of a particular interaction may be under control of, e.g. a human player. System 100 may include one or more servers 12. Server 12 may be configured to communicate with one or more client computing platforms 14 according to a client/server architecture. The users may access system 100 and/or the virtual space via client computing platforms 14.

Server 12 may include electronic storage 50, one or more processors 110, and/or other components. Server 12 and/or processor 110 may be configured to execute one or more computer program modules. The computer program modules may be configured to enable a user associated with the given client computing platform 14 to interface with system 100 and/or external resources 16, and/or provide other functionality attributed herein to client computing platforms 14. Server 12 may include communication lines, or ports to enable the exchange of information with a network and/or other computing platforms. Illustration of server 12 in FIG. 1 is not intended to be limiting. Server 12 may include a plurality of hardware, software, and/or firmware components operating together to provide the functionality attributed herein to server 12. For example, server 12 may be implemented by a cloud of computing platforms operating together as server 12.

By way of non-limiting example, the given client computing platform 14 may include one or more of a desktop computer, a laptop computer, a handheld computer, a tablet computing platform, a NetBook, a Smartphone, a gaming console, and/or other computing platforms.

External resources 16 may include sources of information, hosts and/or providers of virtual environments outside of system 100, external entities participating with system 100, and/or other resources. In some implementations, some or all of the functionality attributed herein to external resources 16 may be provided by resources included in system 100.

Server(s) 12 and/or client computing platform(s) 14 may include electronic storage 50. Electronic storage 50 of server 12 may store different information than electronic storage 50 of an individual client computing platform 14. In some implementations, functionality attributed herein to processor 110 of server 12 or to a computer program module of server 12 may be not limited to server 12, but rather may be provided by resources of individual client computing platforms 14, and/or jointly provided by both server 12 and one or more client computing platforms 14. The depiction in FIG. 1 is not intended to be limiting in any way with regard to the location of any particular functionality described herein. The terms "client computing platform" and "client" may be used interchangeably herein.

Server 12, client computing platforms 14, and/or external resources 16 may be operatively linked via one or more electronic communication links. For example, such electronic communication links may be established, at least in part, via a network 13 such as the Internet and/or other networks. It will be appreciated that this is not intended to be limiting, and that the scope of this disclosure includes implementations in which servers 12, client computing platforms 14, and/or external resources 16 may be operatively linked via some other communication media.

Server 12 and/or processor 110 may be configured to execute one or more computer program modules. The computer program modules may include one or more of a space module 22, a proximity module 23, an object type module 24, a group module 25, a preference module 26, a ranking module 27, a selection module 28, and/or other modules.

Space module 22 may be configured to implement the instance of the virtual space executed by the computer modules. The instance of the virtual space may reflect the state of the virtual space. The instance of the virtual space may be used to push state information to clients for implementation on the clients, may be used to verify state information generated on clients executing expressions of the instance locally, and/or for other purposes. State information may include information about the state of the virtual space such as, without limitation, perception information, position information of objects, state attributes of objects, topography information, one or more navigation maps, areas and/or regions in the virtual space, object status/shape information, battle information, score information, user or character progress information, user inventory information, progress information for one or more activities or actions, view information describing a view of the virtual space, and/or other information that describes the state of the virtual space.

Expressions of the instance executed on the client computing platforms may facilitate presentation of views, on the client computing platforms, of the virtual space. Expressions of the instance executed on the client computing platforms may be configured to present views of the virtual space based on the state information (e.g., via streaming view information, object/position information, and/or other state information) received from space module 22. Expressions of the instance executed on the clients may be synchronized with state information received from space module 22. The view presented on a given client may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

Users may interact with each other through communications exchanged within the virtual space. Such communications may include one or more of textual chat, instant messages, private messages, voice communications, and/or other communications. Communications may be received and entered by the users via their respective client computing platforms 14. Communications may be transferred to and from the appropriate users through server 12 (e.g., through space module 22).

The instance of the virtual space may comprise a simulated space that is accessible by users via clients (e.g., client computing platforms 14) that present the views of the virtual space to a user. The instance executed by the computer modules may be synchronous, asynchronous, and/or semi-synchronous. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography, and/or another topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein).

Within the instance of the virtual space executed by space module 22, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user-controlled element(s) may move through and interact with the virtual space (e.g., NPCs and/or other objects in the virtual space). The user-controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

One or more users may participate in the instance of the virtual space by controlling one or more of the available user controllable objects in the virtual space. Control may be exercised through control inputs and/or commands input by the users through client computing platforms 14. For example, a user may user control inputs to control the position, direction, speed, and/or parameters relevant to movement and/or location of the user character within the virtual space. By way of non-limiting example, control inputs may include one or more designated buttons on a game controller. The user may have numerous opportunities to interact with objects. One or more potential interactions may be accessible for quick and/or easy selection, for example through a designated control input. Based on gameplay, context, and/or one or more of the many other considerations described in this disclosure, one or more suggested interactions may be mapped to one or more designated control input for quick and easy access. Such mappings may be shown and/or presented to a human player, for example by overlaying textual and/or graphical information in a view of the virtual space.

Proximity module 23 may be configured to determine sets of objects that are sufficiently close to individual characters within the virtual space. For example, proximity module 23 may be configured to determine a set of objects that are sufficiently close to the user character for interaction with the user character. In some implementations, the determined set of objects is character-specific. The term "sufficiently close" may be defined by a distance. This distance may be defined before gameplay and may be dynamically determined during gameplay. In some implementations, the term "sufficiently close" may be defined as close enough such that interaction between a particular individual character and individual ones of the determined set of objects is either deemed not impossible, or at least probable beyond a minimum threshold of probability. Based on the determined measure, objects may be included in or excluded from the determined set of objects. Determinations by proximity module 23 may be triggered by various circumstances, including but not limited to movement by a character and/or object in view.

Object type module 24 may be configured to determine object types of objects. In some implementations, object type module 24 may be configured to determine object types of objects is the determined set of objects, as determined by proximity module 24. Object types may be determined individually per object. In some implementations, objects may correspond to multiple object types. For example, object types may be small weapons, large weapons, short-range weapons, mid-range weapons, modes of transport, and/or other object types. In some implementations, determination of object types may be character-specific. For example, for sufficiently large and/or strong characters, a distinction between small and large weapons may not be needed, as either can be lifted and/or used.

Group module 25 may be configured to determine groups of object types. Group module 25 may be configured to group different object types together in a single group. For example, different types of weapons may be grouped together. For example, different modes of transportation may be grouped together. In some implementations, individual groups may be associated with a particular perception type. In some implementations, individual perception types may be limited to being associated with a single group. Operations by group module 25 may be character-specific. For a particular individual character, group module 25 may be configured to determine groups of object types such that all or some of the object types of the objects in the set of objects determined by proximity module 23 are classified and/or organized into different groups. Determinations by group module 25 may be made such that each group of object types for the particular individual character may be associated with a different perception type. By virtue of objects being associated with objects types, the determined groups inherently define group-specific subsets of objects. In particular, such a subset of objects may be a subset of the set of objects determined by proximity module 25.

Preference module 26 may be configured to select objects from groups of objects and/or for groups of object types. Selecting an object for a particular group of object types may be interpreted as selecting an object from a set of objects that are associated with one or more object types of the particular group. Selected objects may be referred to as preferred objects. In some implementations, preference module 26 may be configured to select one or more preferred objects per group. In some implementations, preference module 26 may be configured to select one or more preferred objects per perception type, since an individual group may be associated with an individual perception type. For example, a group of objects "to ride or mount for transportation" may include a nearby car, bike, and horse. Based on state attributes, preferences, and/or other considerations, preference module 26 may select a preferred object "to ride or mount for transportation". For example, a group of objects "to unleash weapons upon" may include a mostly harmless NPC, a building, and a dangerous enemy monster. Based on state attributes, preferences, and/or other considerations, preference module 26 may select a preferred object to unleash weapons upon, or even a particular weapon to be unleashed upon a particular preferred object.

Operation of preference module 26 may be based on analysis of the set of state attributes of the user character, and/or the set of state attributes of objects, for example objects from the set of objects as determined by proximity module 23. For example, certain state attributes may be represented by numerical values. Interpretation of these numerical values may be dependent on the object type, perception type, and/or other considerations. For example, numerical values for a group of objects "to ride or mount for transportation" may reflect a (relative) preference for individual objects. In other words, a particular character may leap at the opportunity to ride a dragon, but not a scooter. For example, numerical values for a group of objects "to unleash weapons upon" may reflect worthy targets from unworthy targets, friends from foes, levels of danger when getting into a fight, etc. Determinations using such numerical values may be made dynamically. For example, the user character may be more eager to engage in fights if he is well armed, or if a particular enemy character is weakened or wounded, or if a particular target is in the perfect range for a particular weapon, etc. State attributes for the user character and/or objects within the virtual space may be organized and/or stored in a spreadsheet and/or database. Operation of preference module 26 may be based on comparisons of numerical values associated with objects. For example, given the current circumstances, a user character may have a preference for riding a scooter, despite normally, under different circumstances, not favoring that as a mode of transportation.

In some implementations, operation of preference module 26 is based on detection types of objects. Detection types of objects may correspond to requirements for possible interactions with the user character. For example, a particular object may only be considered a target if it is in the line of sight of the user character, in the field of view, in the general direction the user character is facing, and/or otherwise restricted from being considered a target. Detection types may be object-specific, character-specific, perception-specific, and/or otherwise specific. For example, some objects can only be targeted with weaponry of the user character has the object in his line of sight. The required detection type may depend on the particular weapon or weapons the user character is using.

Ranking module 27 may be configured to rank objects for interaction with characters. This ranking may provide guidance to human and other players in selecting one or more interactions from a large number of options. In particular, ranking module 27 may be configured to rank objects for interaction with the user character. Rankings by ranking module 27 may be character-specific. In some implementations, the ranked objects are the preferred objects as determined by preference module 26. Operations by ranking module 27 may be based on analysis of the set of state attributes of the user character, and/or the set of state attributes of objects, for example objects from the set of objects as determined by proximity module 23. Operation of ranking module 27 may be based on comparisons of numerical values associated with objects. For example, given the current circumstances, a user character may rank riding a scooter higher than firing a puny weapon at a dangerous enemy monster. For example, hoisting a bazooka on the user character's shoulders may alter not only which target may be preferred, but also which perception type (or manner of interaction) is ranked highest.

By virtue of the guidance provided as described in this disclosure, a user and/or character may easily and/or quickly evaluate numerous options for potential interactions at any moment (or even continuously) during gameplay. Through grouping objects together that are associated with one or more perception types (e.g. corresponding to a manner of interaction), and by ranking one or more preferred objects for a group relative to the one or more preferred objects for other groups, the system is able to quickly evaluate numerous permissible interactions and present one or more interactions for selection by a human or other player. Note that a player is free to ignore the ranking of selected preferred objects in favor of any permissible interaction. In some implementations, system 100 may learn player preferences in order to determine better rankings.

Selection module 28 may be configured to obtain object selections for interactions with characters. For example, selection module 28 may be configured to obtain an object selection for an interaction with the user character. Selections may be from the one or more ranked objects, from one or more preferred objects, from one or more objects in a set of objects are determined by proximity module 28, and/or from other objects. Selection from the one or more ranked objects may be controlled by human players, by AI for NPC, and/or by other modes of control. In some implementations, NPCs may be designed to have multiple goals. For example, an NPC bandit may have a goal of attacking other characters and robbing banks. The AI or other logic in control of the NPC bandit may benefit from similar guidance as human players, and be presented with a ranking of preferred objects for interaction. Based on a choice between different goals, the NPC bandit may select a particular interaction.

Figure 3:
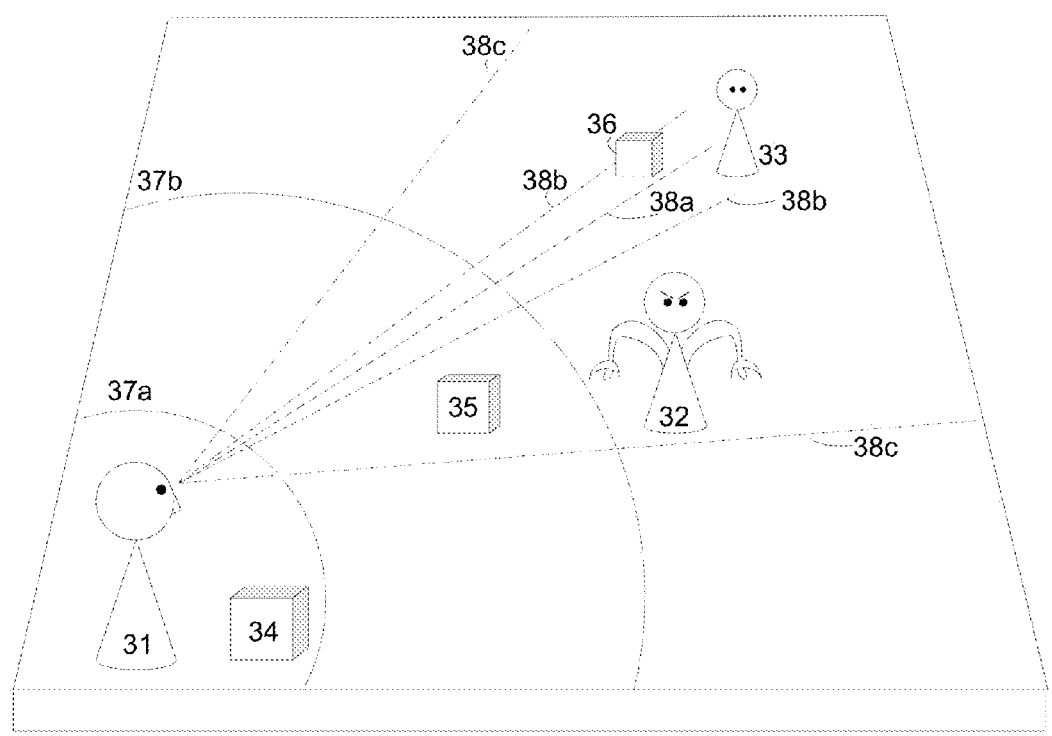
FIG. 3 illustrates a view of a virtual space.

By way of illustration, FIG. 3 illustrates a view 30 of a particular virtual space in which a game is being played. View 30 includes characters 31-32-33, objects 34-35-36, and/or other elements. A human player is controlling character 31. The line of sight of character 31 is indicated by direction 38a. The field-of-view of character 31 is indicated between boundaries 38b. The general direction character 31 is facing is indicated between boundaries 38c. A first proximity threshold is indicated by 37a. A second proximity threshold is indicated by 37b. Other proximity thresholds may be used, even though not depicted in view 30.

Referring to FIG. 3, a proximity module may determine which objects in view 30 are sufficiently close to character 31 such that interaction with character 31 is at least possible. Assume that all objects in FIG. 3 are deemed sufficiently close. As depicted in view 30, object 34 is close to character 31. For example, if object 34 is a horse, character 31 may decide to mount it. For example, if object 34 is a chair, character 31 may decide to pick it up, sit on it, and/or throw it. As depicted, object 35 is located beyond first proximity threshold 37a. Depending on the object type of object 35, this may mean interaction is, e.g., impossible from the current position of character 31. For example, if object 35 is a chair, character 31 cannot sit in it, though it may be possible to blow it up using a hand grenade. As depicted, object 36 is located beyond second proximity threshold 37b. Depending on the object type of object 36, this may mean certain types of interaction are not possible until character 31 and object 36 are in closer proximity.

Referring to FIG. 3, an object type module may determine object types for the objects in view 30. Note that objects may have multiple object types. For example, if object 34 is a chair, its object type may include one or more of the following: can-be-picked up, can-be-carried, can-be-thrown, can-be-sat-in-or-on, can-be-shot-with-projectile-weapons, can-be-wielded-as-blunt-impact-weapon, and so forth.

Referring to FIG. 3, a group module may determine how to group object types and/or objects in such a way that each group is associated with a different perception type. For example, if object 34 is a horse and object 36 is a car, they may be grouped as modes of transportation. For example, if character 32 and character 33 are enemy monsters, they may be grouped as auto-targets, or objects to unleash weapons upon.

Referring to FIG. 3, a preference module may determine, per group and/or per perception type, one or more preferred objects for interaction. For example, assuming character 31 is carrying a particular type of weapon, depending on the detecting types of character 32 and character 33, one of the two enemy monsters may be the preferred target. For example, the particular weapon may require a target between boundaries 38b. Note that character 31 may quickly and easily target different objects by small movements that change the line-of-sight (and thus other ranges used for detection types).

Referring to FIG. 3, a ranking module may rank the preferred object in a first group of objects (associated with a first perception type) and the preferred object in a second group of objects (associated with a second perception type) in (numerical) order for interaction with character 31.

Server(s) 12 and client computing platform(s) 14 may include electronic storage 50. Electronic storage 50 may comprise electronic storage media that electronically stores information. The functionality of electronic storage 50 may be similar between different instantiations, even if the stored information may be different. Electronic storage 50 may be configured to store behavior trees for objects in a virtual space. Behavior trees may include nodes that correspond to states of objects. Individual behavior trees may correspond to individual objects. The electronic storage media of electronic storage 50 may include one or both of system storage that is provided integrally (i.e., substantially non-removable) and/or removable storage that is removably connectable to server(s) 12 and/or client computing platform(s) 14 via, for example, a port (e.g., a USB port, a firewire port, etc.) or a drive (e.g., a disk drive, etc.). Electronic storage 50 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 50 may include one or more virtual storage resources (e.g., cloud storage, a virtual private network, and/or other virtual storage resources). Electronic storage 50 may store software algorithms, information determined by processor(s) 110, information received from components of system 100, and/or other information that enables server(s) 12 and/or client computing platform(s) 14 to function as described herein.

Server(s) 12 and client computing platform(s) 14 may include processor(s) 110. Processor(s) 110 may be configured to provide information processing capabilities in server(s) 12 and/or client computing platform(s) 14. The functionality of processor(s) 110 may be similar between different instantiations, even if the processing capabilities may be different. Processor(s) 110 may include one or more of a digital processor, an analog processor, a digital circuit designed to process information, an analog circuit designed to process information, and/or other mechanisms for electronically processing information. Although processor(s) 110 is shown in FIG. 1 as a single entity, this is for illustrative purposes only. In some embodiments, processor(s) 110 may include a plurality of processing units. These processing units may be physically located within the same device, or processor(s) 110 may represent processing functionality of a plurality of devices operating in coordination. The processor(s) 110 may be configured to execute modules 22-28, and/or other modules. Processor 110 may be configured to execute modules 22-28, and/or other modules by software; hardware; firmware; some combination of software, hardware, and/or firmware; and/or other mechanisms for configuring processing capabilities on processor(s) 110.

It should be appreciated that although modules 22-28 are illustrated in FIG. 1 as being co-located within two processing units, one or more of modules 22-28 may be located remotely from the other modules. The description of the functionality provided by the different modules 22-28 described below is for illustrative purposes, and is not intended to be limiting, as any of modules 22-28 may provide more or less functionality than is described. For example, one or more of modules 22-28 may be eliminated, and some or all of its functionality may be provided by other ones of modules 22-28. As another example, processor 110 may be configured to execute one or more additional modules that may perform some or all of the functionality attributed herein to one of modules 22-28.

It is noted that the division of functionality between server(s) 12 and client computing platform(s) 14 is not intended to be limited by this disclosure. Functions described in relation with server(s) 12 may be performed and/or shared by one or more other components of system 100, including client computing platform(s) 14, and vice versa.

Figure 2:
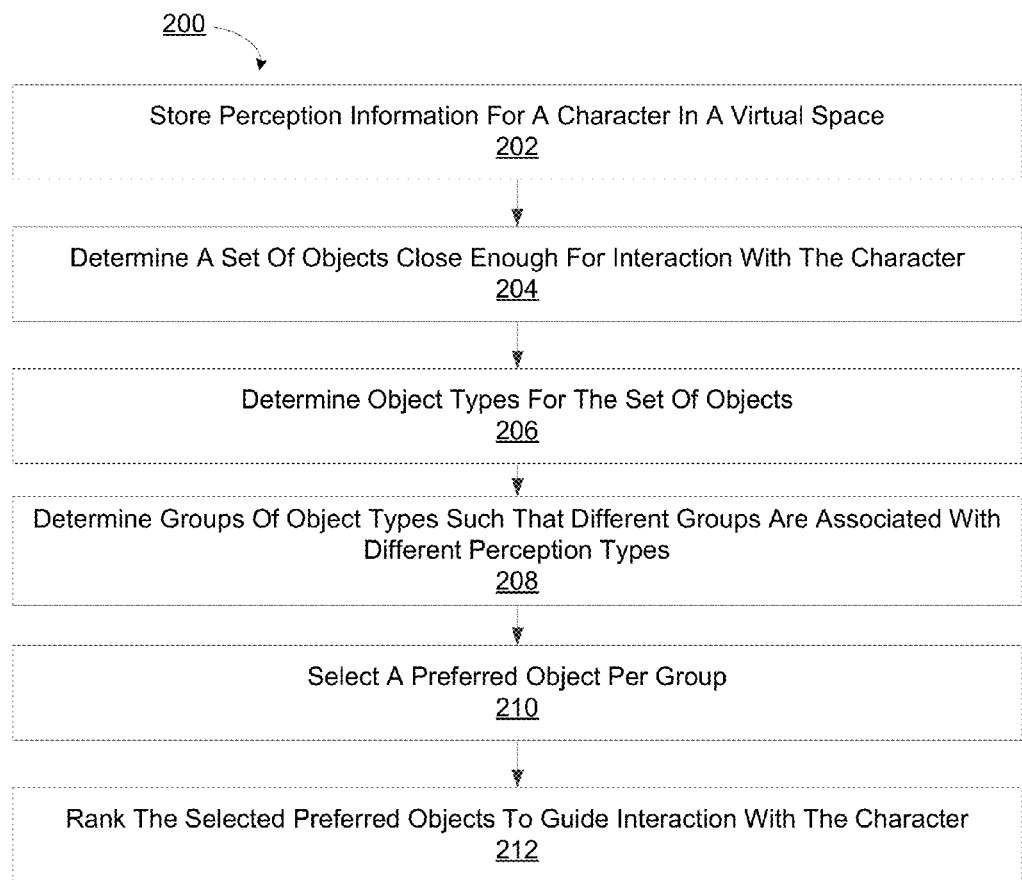
FIG. 2 illustrates a method for guiding interaction of characters with objects in a virtual space, in accordance with one or more embodiments.

FIG. 2 illustrates a method 200 for guiding interaction of characters with objects in a virtual space, in accordance with one or more embodiments. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a controller, a digital circuit designed to process information, an analog circuit designed to process information, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, perception information for an individual character in a virtual space is stored. The perception information includes groups of object types. The object types correspond to types of objects within the virtual space. The groups are associated with perceptions types. The perception types correspond to a manner of interaction with the individual character. In some embodiments, operation 202 is performed by electronic storage the same as or similar to electronic storage 50 (shown in FIG. 1 and described herein). The electronic storage may be configured to store perception information for one or more individual characters.

At an operation 204, a set of objects is determined that are sufficiently close to the individual character such that interaction between the individual character and individual ones of the set of objects is not deemed impossible. The set of objects may include a first object and a second object. In some embodiments, operation 204 is performed by a proximity module the same as or similar to proximity module 23 (shown in FIG. 1 and described herein).

At an operation 206, object types of individual objects in the set of objects are determined. A first object type corresponds to the first object and a second object type corresponds to the second object. In some embodiments, operation 206 is performed by an object type module the same as or similar to object type module 24 (shown in FIG. 1 and described herein).

At an operation 208, a first group of object types is determined that includes the first object type and a second group of object types is determined that includes the second object type. These determinations are in accordance with the perception information for the individual character. The first group is associated with a first perception type and the second group is associated with a second perception type. In some embodiments, operation 208 is performed by a group module the same as or similar to group module 25 (shown in FIG. 1 and described herein).

At an operation 210, a first preferred object for the first group is selected and a second preferred object for the second group is selected. In some embodiments, operation 210 is performed by a preference module the same as or similar to preference module 26 (shown in FIG. 1 and described herein).

At an operation 212, the first preferred object and the second preferred object are ranked (e.g. numerically) to guide interaction with the individual character. In some embodiments, operation 212 is performed by a ranking module the same as or similar to ranking module 27 (shown in FIG. 1 and described herein).

The present invention, in accordance with one or more various implementations, is described above in detail with reference to the accompanying figures. The drawings are provided for purposes of illustration only and merely depict exemplary implementations. These drawings are provided to facilitate the reader's understanding of the systems and methods described herein and shall not be considered limiting of the breadth, scope, or applicability of any of the claims.

Although the systems and methods set forth herein are described in terms of various exemplary implementations and implementations, it should be understood that the various features, aspects and functionality described in one or more of the individual implementations are not limited in their applicability to the particular implementation with which they are described, but instead can be applied, alone or in various combinations, to one or more of the other implementations, whether or not such implementations are described and whether or not such features are presented as being a part of a described implementation. Thus, the breadth and scope of the present disclosure should not be limited by any of the above-described exemplary implementations.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various implementations set forth herein are described in terms of exemplary block diagrams, flow charts, and/or other illustrations. As will become apparent to one of ordinary skill in the art after reading this document, the illustrated implementations and their various alternatives can be implemented without confinement to the illustrated examples. For example, block diagrams and their accompanying description should not be construed as mandating a particular architecture or configuration.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to guide interaction of non-player characters with objects in a virtual space, wherein the objects include a first object and a second object, the system comprising:

electronic storage configured to store perception information for non-player characters in a virtual space, perception information for an individual non-player character being specific to the individual non-player character, wherein perception information includes perception types that are individually associated with objects of a common object type, wherein an individual perception type corresponds to a manner of interaction between the individual non-player character and objects of an individual object type associated with the individual perception type, the electronic storage being configured to store first perception information for a first non-player character, the first perception information including a first perception type that is associated with objects of a first object type, and a second perception type that is associated with objects of a second object type;

one or more physical processors configured by machine-readable instructions to:

determine a set of objects that include objects that are individually positioned a distance from the first non-player character to facilitate interaction between the first non-player character and individual ones of the objects in the set of objects, wherein the set of objects includes the first object and the second object;

determine object types of individual ones of the objects in the set of objects, including determining that the first object corresponds to the first object type and that the second object corresponds to the second object type;

assign objects in the set of objects to groups based on object type, an individual group including objects of a common object type, such that the first object is assigned to a first group that includes objects of the first object type, and the second object is assigned to a second group that includes objects of the second object type;

associate individual ones of the groups with an individual perception type included in the first perception information, the association being based on the associations of perceptions types with object types included in the first perception information, wherein the first group is associated with the first perception type and the second group is associated with the second perception type;

determine preference of one or more objects in individual ones of the groups of objects, one or more preferred objects determined from an individual group corresponding to a determination of one or more preferred objects of an individual perception type, the determined one or more preferred objects including a first preferred object that is determined from the first group and a second preferred object that is determined from the second group;

assign individual ranks to individual ones of the one or more preferred objects based on a current circumstance of the first non-player character in the virtual space and the perception types associated with individual ones of the one or more preferred objects, the individual ranks being configured to guide the first character to one or more object selections of one or more of the preferred objects that are associated with a perception type conveying a manner of interaction corresponding to the current circumstance;

make one or more object selections of one or more of the preferred objects for interaction with the first non-player character based on the assigned individual ranks, a first object selection of either the first preferred object or the second preferred object being made based on a first rank assigned to the first preferred object and a second rank assigned to the second preferred object; and effectuate the one or more object selections to facilitate interaction of the first non-player character with one or more of the preferred objects, such that based on the first rank being higher than the second rank, effectuating the first object selection facilitates an interaction of the first non-player character with the first preferred object.

2. The system of claim 1, wherein individual ones of the groups are associated with individual ones of the perception types.

3. The system of claim 1, wherein the first object type is different from the second object type.

4. The system of claim 1, wherein the first perception type is different from the second perception type.

5. The system of claim 1, wherein determining preference of one or more objects is further based on comparisons of numerical values associated with objects in the set of objects.

6. The system of claim 1, wherein the first preferred object comprises the first object and the second preferred object comprise the second objects, and wherein assigning the ranks to individual ones of the one or more preferred objects is further based on comparisons of numerical values associated with individual ones of the first object and the second object.

7. The system of claim 1, wherein an individual object may corresponds to one or more object types.

8. The system of claim 1, wherein individual objects are associated with individual sets of state attributes that define interactions with other objects in the virtual space, such that the first non-player character is associated with an individual set of state attributes, the first object is associated with a first set of state attributes, and the second object is associated with a second set of state attributes.

9. The system of claim 8, wherein determining preference is further based on analysis of the individual set of state attributes, the first set of state attributes, and the second set of state attributes.

10. The system of claim 1, wherein objects are associated with detection types that define requirements for interactions with other objects in the virtual space such that the first object is associated with a first detection type, and such that the second object is associated with a second detection type.

11. A computer-implemented method for guiding interaction of non-player characters with objects in a virtual space, the method being implemented in a computer system that includes one or more physical processors and storage media storing machine-readable instructions, the objects including a first object and a second object, the method comprising:

storing perception information for individual non-player characters in a virtual space, perception information for an individual non-player character being specific to the individual non-player character, wherein the perception information includes perception types that are individually associated with objects of a common object type, wherein an individual perception type corresponds to a manner of interaction between the individual non-player character and objects of an individual object type associated with the individual perception type, including storing first perception information for a first non-player character, the first perception information including a first perception type that is associated with objects of a first object type, and a second perception type that is associated with objects of a second object type;

determining a set of objects that includes objects that are individually positioned a distance from the first non-player character to facilitate interaction between the first non-player character and individual ones of the objects in the set of objects, wherein the set of objects includes the first object and the second object;

determining object types of individual ones of the objects in the set of objects, including determining that the first object corresponds to the first object type and the second object corresponds to the second object type;

assigning objects in the set of objects to groups based on object type, an individual group including objects of a common object type, such that the first object is assigned to a first group that includes objects of the first object type, and the second object is assigned to a second group that includes objects of the second object type;

associating individual ones of the groups with an individual perception type included in the first perception information, the association being based on the associations of perception types with objects types included in the first perception information, wherein the first group is associated with the first perception type and the second group is associated with the second perception type;

determining preference of one or more objects in individual ones of the groups of objects, one or more preferred objects determined from an individual group corresponding to a determination of one or more preferred objects of an individual perception type, including determining a first preferred object from the first group and a second preferred object from the second group;

assigning individual ranks to individual ones of the one or more preferred objects based on a current circumstance of the first non-player character in the virtual space and the perception types associated with individual ones of the one or more preferred objects, the individual ranks being configured to guide the first non-player character to one or more object selections of one or more of the preferred objects that are associated with a perception type conveying a manner of interaction corresponding to the current circumstance;

making one or more object selections of one or more of the preferred objects for interaction with the first non-player character based on the assigned individual ranks, a first object selection of either the first preferred object or the second preferred object being made based on a first rank assigned to the first preferred object and a second rank assigned to the second preferred object; and effectuating the one or more object selections to facilitate interaction of the first non-player character with one or more of the preferred objects, such that based on the first rank being higher than the second rank, effectuating the first object selection facilitates an interaction of the first non-player character with the first preferred object.

12. The method of claim 11, wherein the first preferred object comprises the first object and the second preferred object comprise the second objects, and wherein the method further comprises:

assigning individual ranks to the first preferred object and the second preferred object based on comparisons of numerical values associated with individual ones of the first object and the second object.

13. The method of claim 11, wherein individual objects are associated with individual sets of state attributes that define manners of interactions with other objects in the virtual space, such that the first non-player character is associated with an individual set of state attributes, the first object is associated with a first set of state attributes, and the second object is associated with a second set of state attributes.

14. The method of claim 13, further comprising assigning respective ranks to the first preferred object and second preferred object based on analysis of the individual set of state attributes, the first set of state attributes, and the second set of state attributes.

15. The method of claim 11, wherein individual objects are associated with individual detection types that define requirements for interactions with other objects in the virtual space such that the first object is associated with a first detection type, and such that the second object is associated with a second detection type.

* * * * *